United States Patent
Ferrier et al.

(10) Patent No.: US 12,411,014 B2
(45) Date of Patent: Sep. 9, 2025

(54) SPECIFIC TRAVERSAL PLAN FROM GENERAL PLAN AND ACTUAL TRAVERSAL OF LATTICE

(71) Applicant: Trimble Inc., Westminster, CO (US)

(72) Inventors: Adrian Ferrier, Avondale Estates, GA (US); Kapil Tahiliani, Atlanta, GA (US); Juan Carlos Santamaria, Alpharetta, GA (US); Darren Howie, Rio Verde, AZ (US); Kevin Pattison, Calgary (CA)

(73) Assignee: Trimble Inc., Westminster, CO (US)

( * ) Notice: Subject to any disclaimer, the term of this patent is extended or adjusted under 35 U.S.C. 154(b) by 501 days.

(21) Appl. No.: 18/071,997

(22) Filed: Nov. 30, 2022

(65) Prior Publication Data

US 2024/0172576 A1    May 30, 2024

(51) Int. Cl.
G01C 21/34    (2006.01)
G05D 1/229    (2024.01)

(52) U.S. Cl.
CPC ....... *G01C 21/3407* (2013.01); *G05D 1/2297* (2024.01)

(58) Field of Classification Search
CPC ............ G01C 21/3407; G05D 1/2297; G05D 2105/15; G05D 2107/21; G05D 2109/10; G05D 1/644; G05D 1/648; A01B 69/008
See application file for complete search history.

(56) References Cited

U.S. PATENT DOCUMENTS

| | | | |
|---|---|---|---|
| 2006/0178825 A1* | 8/2006 | Eglington | G01S 19/14 701/410 |
| 2011/0196565 A1* | 8/2011 | Collins | A01B 69/007 701/25 |
| 2016/0078391 A1* | 3/2016 | Blank | G06Q 50/02 705/7.42 |
| 2016/0091898 A1 | 3/2016 | Booher | |
| 2018/0156622 A1* | 6/2018 | Mouthaan | G01C 21/3407 |
| 2019/0239416 A1* | 8/2019 | Green | G05D 1/0219 |
| 2019/0340933 A1* | 11/2019 | Villa | B64C 29/0016 |
| 2021/0064050 A1 | 3/2021 | Pickett et al. | |

OTHER PUBLICATIONS

Extended European Search Report for Application No. 23212867.8-1205, mailed Feb. 29, 2024, 10 pages.
Communication for EP Application No. 23 212 867.8-1201, mailed Mar. 6, 2025, 9 pages.

* cited by examiner

*Primary Examiner* — Frederick M Brushaber
(74) *Attorney, Agent, or Firm* — Kilpatrick Townsend & Stockton LLP

(57) ABSTRACT

A specific plan for traversing a lattice of a geographic region is generated and provided to an autonomous vehicle. A general plan that includes the lattice and a planned sequence of operator traversal data of the lattice is received. Actual operator traversal data used to traverse the geographical region is determined. A tolerance range that defines an allowable deviation from the general plan is determined. A first subset of the actual operator traversal data that is within the tolerance range and a second subset of the actual operator traversal data that is not within the tolerance range is determined. A specific plan for traversing the geographical region is formulated based on the first subset of the actual operator traversal data that is within the tolerance range. The specific plan is provided to the autonomous vehicle for controlling traversal of the geographical region by the autonomous vehicle.

20 Claims, 9 Drawing Sheets

Extracted Vehicle Trajectory Points

SPECIFIC TRAVERSAL PLAN FROM GENERAL PLAN AND ACTUAL TRAVERSAL OF LATTICE

BACKGROUND

This disclosure relates in general to autonomous vehicle control. Autonomous vehicles can be used to perform various tasks. The various tasks include construction tasks, such as steamrolling tasks, bulldozing tasks, and the like, agricultural tasks, such as plowing, seeding, and the like, and other suitable tasks. The autonomous vehicles use input that includes instructions for performing the various tasks.

SUMMARY

This disclosure relates to autonomous vehicle control, and without limitation to generating a specific plan for an autonomous vehicle based on a general plan and actual operator traversal data. A general plan includes a lattice and actual operator traversal data relating to a geographical region and task. In some embodiments, the geographical region includes an agricultural plot, the lattice includes boundaries of the agricultural plot, row spacing and direction, and may represent or be associated with a task such as planting or harvesting a crop, and the actual operator traversal data includes an operator sequence of traversing rows of the agricultural plot while performing the task. The general plan is received, and the operator sequence used to traverse the geographical region is determined through analysis. The analysis includes spatial and temporal data relating to traversal of the geographical region by an entity, which can include an operator, an autonomous vehicle, or other suitable entity. The analysis divides data that is within a predetermined tolerance range and data that is not within the predetermined tolerance range. The predetermined tolerance range defines an allowable deviation of actual operator traversal data from the general plan. A specific plan is generated based on the actual operator traversal data and the general plan. For example, the specific plan can be formulated using data included in the actual operator traversal data that is within the predetermined tolerance range. Accordingly, excessive spatial traversal and temporal traversal of the general plan is removed from the actual operator traversal data for formulating the specific plan. The specific plan is used to compare performances, as input for an autonomous vehicle, and for other purposes. For example, performances of two distinct entities with respect to traversing the general plan can be compared using the specific plan. Additionally, the specific plan, or an optimized version thereof, can be input into the autonomous vehicle for controlling traversal of the geographical region by the autonomous vehicle.

In certain embodiments, a method for formulating and using a specific plan for traversing a geographical region comprises: receiving, by a computing device, a general plan that comprises (i) a lattice representing a geographical region and task, and (ii) actual operator traversal data that includes a planned sequence for traversing the lattice of the geographical region; determining, by the computing device, actual operator traversal data used by an entity to traverse the geographical region, a plurality of elements corresponding to spatial and temporal data of the actual operator traversal data can be used to determine the operator sequence; determining, by the computing device, a tolerance range that defines an allowable deviation of the operator sequence from the general plan; determining, by the computing device, a first subset of the plurality of elements that is within the determined tolerance range; determining, by the computing device, a second subset of the plurality of elements that is not within the determined tolerance range; formulating, by the computing device, a specific plan based on the general plan, the specific plan comprising the first subset of the plurality of elements included in the actual operator traversal data; comparing, by the computing device, the actual operator traversal data to the specific plan for determining an efficiency of the actual operator traversal data; comparing, by the computing device, the actual operator traversal data to separate actual operator traversal data used by a separate entity to traverse the geographical region by (i) determining, by the computing device, a first amount of space and time that the actual operator traversal data conformed to the specific plan, (ii) determining, by the computing device, a second amount of space and time that the separate actual operator traversal data conformed to the specific plan, and (iii) comparing, by the computing device, the first amount of space and time to the second amount of space and time; and providing, by the computing device, the specific plan as input into an autonomous vehicle for controlling traversal of the geographic region by the autonomous vehicle. In some embodiments, the plurality of elements that corresponds to spatial and temporal data comprises (i) position data that indicates a position of the entity with respect to the lattice during traversal of the geographic region by the entity, and (ii) temporal data that indicates a time and speed at which the entity traversed respective positions of the position data while traversing the geographic region; the method further comprises (i) optimizing, by the computing device, the specific plan by generating an optimized trajectory that minimizes a total distance required to traverse the geographic region, and (ii) providing, by the computing device, the optimized specific plan as input into the autonomous vehicle for controlling traversal of the geographic region by the autonomous vehicle; a union of the first subset of the plurality of elements and the second subset of the plurality of elements is the plurality of elements, an intersection of the first subset of the plurality of elements and the second subset of the plurality of elements is zero, and comparing the actual operator traversal data to the specific plan comprises determining, by the computing device and by comparing the first subset of the plurality of elements and the second subset of the plurality of elements (i) a percentage of space that the actual operator traversal data conformed to the specific plan, and (ii) a percentage of time that the actual operator traversal data conformed to the specific plan; and/or determining the first subset of the plurality of elements that is within the determined tolerance range comprises, for each element included in the plurality of elements, (i) determining whether a spatial component of the element is included in the lattice of the general plan, and (ii) if the spatial component of the element is not included in the lattice, determining whether the spatial component is within the determined tolerance range of the lattice.

In certain embodiments, a method for formulating and providing a specific plan to an autonomous vehicle comprises: receiving, by a computing device, a general plan that comprises (i) a lattice representing a geographical region and task, and (ii) actual operator traversal data that includes a planned sequence for traversing the lattice of the geographical region; determining, by the computing device, an actual operator traversal data used by an entity to traverse the geographical region, a plurality of elements corresponding to spatial and temporal data of the actual operator traversal data can be used to determine the operator sequence; determining, by the computing device, a tolerance range that defines an allowable deviation of the actual operator traversal data from the general plan; determining, by the computing device, a first subset of the plurality of elements that is within the determined tolerance range; determining, by the computing device, a second subset of the plurality of elements that is not within the determined tolerance range; formulating, by the computing device, a specific plan based on the general plan, the specific plan comprising the first subset of the plurality of elements included in the actual operator traversal data; and providing, by the computing device, the specific plan as input into an autonomous vehicle for controlling traversal of the geographic region by the autonomous vehicle. In some embodiments, the method further comprises comparing, by the computing device, the actual operator traversal data to the specific plan for determining an efficiency of the actual operator traversal data; the method further comprises comparing, by the computing device, the actual operator traversal data to separate actual operator traversal data used by a separate entity to traverse the geographical region; comparing the actual operator traversal data to the separate actual operator traversal data comprises (i) determining, by the computing device, a first amount of space and time that the actual operator traversal data conformed to the specific plan, (ii) determining, by the computing device, a second amount of space and time that the separate actual operator traversal data conformed to the specific plan, and (iii) comparing, by the computing device, the first amount of space and time to the second amount of space and time; the plurality of elements that corresponds to spatial and temporal data comprises (i) position data that indicates a position of the entity with respect to the lattice during traversal of the geographic region by the entity, and (ii) temporal data that indicates a time and speed at which the entity traversed respective positions of the position data while traversing the geographic region; the method further comprises (i) optimizing, by the computing device, the specific plan by generating an optimized trajectory that minimizes a total distance required to traverse the geographic region, and (ii) providing, by the computing device, the optimized specific plan as input into the autonomous vehicle for controlling traversal of the geographic region by the autonomous vehicle; a union of the first subset of the plurality of elements and the second subset of the plurality of elements is the plurality of elements, an intersection of the first subset of the plurality of elements and the second subset of the plurality of elements is zero, and comparing the actual operator traversal data to the specific plan comprises determining, by the computing device and by comparing the first subset of the plurality of elements and the second subset of the plurality of elements, (i) a percentage of space that the actual operator traversal data conformed to the specific plan, and (ii) a percentage of time that the actual operator traversal data conformed to the specific plan; and/or determining the first subset of the plurality of elements that is within the determined tolerance range comprises, for each element included in the plurality of elements, (i) determining whether a spatial component of the element is included in the lattice of the general plan, and (ii) if the spatial component of the element is not included in the lattice, determining whether the spatial component is within the determined tolerance range of the lattice.

In certain embodiments, a method for formulating a specific plan for comparing entity performance comprises: receiving, by a computing device, a general plan that comprises (i) a lattice representing a geographical region and task, and (ii) actual operator traversal data that includes a planned sequence for traversing the lattice of the geographical region; determining, by the computing device, an actual operator traversal data used by an entity to traverse the geographical region, a plurality of elements corresponding to spatial and temporal data of the actual operator traversal data can be used to determine the operator sequence; determining, by the computing device, a tolerance range that defines an allowable deviation of the actual operator traversal data from the general plan; determining, by the computing device, a first subset of the plurality of elements that is within the determined tolerance range; determining, by the computing device, a second subset of the plurality of elements that is not within the determined tolerance range; formulating, by the computing device, a specific plan based on the general plan, the specific plan comprising the first subset of the plurality of elements included in the actual operator traversal data; and comparing, by the computing device, the actual operator traversal data to the specific plan for determining an efficiency of the actual operator traversal data. In some embodiments, the method further comprises comparing, by the computing device, the actual operator traversal data to separate actual operator traversal data used by a separate entity to traverse the geographical region; comparing the actual operator traversal data to the separate actual operator traversal data comprises (i) determining, by the computing device, a first amount of space and time that the actual operator traversal data conformed to the specific plan (ii) determining, by the computing device, a second amount of space and time that the separate actual operator traversal data conformed to the specific plan, and (iii) comparing, by the computing device, the first amount of space and time to the second amount of space and time; the method further comprises providing, by the computing device, the specific plan as input into an autonomous vehicle for controlling traversal of the geographic region by the autonomous vehicle; the method further comprises (i) optimizing, by the computing device, the specific plan by generating an optimized trajectory that minimizes a total distance required to traverse the geographic region, and (ii) providing, by the computing device, the optimized specific plan as input into the autonomous vehicle for controlling traversal of the geographic region by the autonomous vehicle; the plurality of elements that corresponds to spatial and temporal data comprises (i) position data that indicates a position of the entity with respect to the lattice during traversal of the geographic region by the entity, and (ii) temporal data that indicates a time and speed at which the entity traversed respective positions of the position data while traversing the geographic region; and/or a union of the first subset of the plurality of elements and the second subset of the plurality of elements is the plurality of elements, an intersection of the first subset of the plurality of elements and the second subset of the plurality of elements is zero, and comparing the actual operator traversal data to the specific plan comprises determining, by the computing device and by comparing the first subset of the plurality of elements and the second subset of the plurality of elements, (i) a percentage of space that the actual operator traversal data conformed to the specific plan, and (ii) a percentage of time that the actual operator traversal data conformed to the specific plan.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
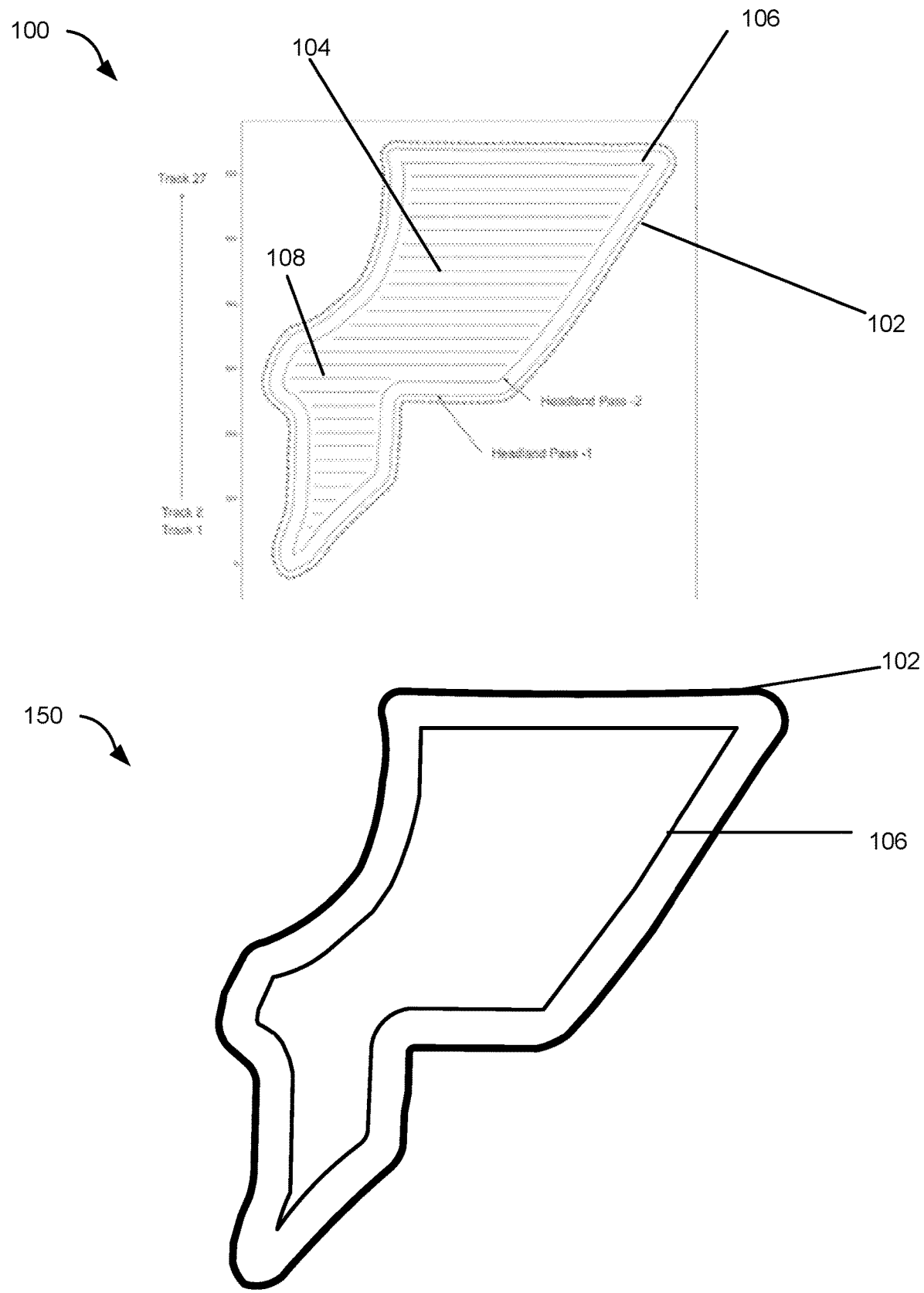
FIG. 1 depicts an embodiment of a general plan for traversing a geographical region.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure, without limitation, relates to generating a specific traversal plan for comparing trajectories and for input into an autonomous vehicle. The specific traversal plan can be generated based on a general plan and based on an actual operator traversal of a geographical region. The general plan can include a lattice representing the geographical region and task and a planned sequence for traversing the geographical region or lattice thereof. The actual operator traversal can include spatial data and temporal data relating to an entity traversing the lattice of the general plan. The entity can include an autonomous vehicle, an operator, or any other suitable entity. The specific traversal plan can be generated by determining a subset of the spatial data and/or a subset of the temporal data of the actual operator traversal of the lattice. For example, the subset of the spatial data and/or the subset of the temporal data of the actual operator traversal can be used to populate the specific traversal plan. The specific traversal plan can be used to compare actual operator traversal data used to traverse the geographical region. For example, the actual operator traversal can be compared against actual traversal of an autonomous vehicle, and the like. Additionally, the specific traversal plan can be input into an autonomous vehicle for controlling the actual traversal of the autonomous vehicle with respect to the geographical region.

In some configurations, a method comprises receiving a general plan that includes a lattice and a planned sequence for traversing the lattice. In some examples, the lattice represents a geographical region and task, and the planned sequence represents a direction for traversing the lattice of the geographical region. The method additionally comprises determining actual operator traversal data used by an entity to traverse the geographical region. In some examples, the actual operator traversal data includes elements corresponding to spatial data and temporal data of the operator sequence included in the actual operator traversal data. The method also involves determining a first subset of the elements of the operator sequence and a second subset of the elements of the operator sequence. The first subset of the elements may be within a determined tolerance range, and the second subset of the elements may not be within the determined tolerance range. In some examples, the determined tolerance range defines an allowable deviation of elements of the actual operator traversal data from the general plan. The method additionally involves formulating a specific traversal plan based on the general plan such that the specific traversal plan includes the first subset of the elements of the actual operator traversal data. The specific traversal plan can be used in various techniques. In one example, the specific traversal plan is used, as a comparison with respect to the actual operator traversal data, to determine an efficiency of the actual operator traversal data. In another example, the specific traversal plan is used as input to an autonomous vehicle for controlling traversal of the autonomous vehicle with respect to the geographical region. In yet another example, the specific traversal plan is used to compare the actual operator traversal data to separate actual operator traversal data (e.g., comparing an operator's performance against an autonomous vehicle's performance, etc.). For example, a first amount of space and time that the actual operator traversal data conformed to the specific traversal plan can be determined. Additionally, a second amount of space and time that the separate actual operator traversal data conformed to the specific plan can be determined. Accordingly, the first amount of space and time can be compared to the second amount of space and time to compare the actual operator traversal data to the separate actual operator traversal data.

The specific traversal plan can be determined for various applications. In one such example, the specific traversal plan can be determined for one or more agricultural applications including plowing the geographical area, seeding the geographical area, and the like. In another such example, the specific traversal plan can be determined for one or more construction applications including grading a construction site, paving a road, and the like. Other suitable applications can use the specific traversal plan to compare actual operator traversal data, control autonomous vehicles, or a combination thereof.

The following illustrative examples are presented to introduce the reader to the general subject matter discussed herein and are not intended to limit the scope of the disclosed concepts. The following sections describe various additional features and examples with reference to the drawings in which like numerals indicate like elements and directional descriptions are used to describe the illustrative aspects but, like the illustrative aspects, should not be used to limit the present disclosure. Additionally, the presented figures are generally described with respect to agricultural operations, but the general subject matter discussed herein is not limited to agricultural operations.

Referring first to FIG. 1, an embodiment of a general plan 100 for traversing a geographical region 150 is illustrated. The general plan 100 includes a lattice 102, a planned sequence 104 for traversing the geographical region 150, and/or any other suitable components for the general plan 100. As illustrated, the general plan 100 is associated with the geographical region 150 that represents an agricultural field, though other embodiments of the general plan 100 and the geographical region 150 are possible.

In some embodiments, the lattice 102 includes boundaries, row direction and spacing, and/or other suitable features of the geographical region 150 of the general plan 100. For example, and as illustrated, the lattice 102 includes an outline of the geographical region 150. Additionally or alternatively, the lattice 102 can include an exterior path 106 that may be traversed by an entity around the geographical region 150. In some examples, the planned sequence 104 for traversing the geographical region 150 can be based on the lattice 102 and can correspond to a task associated with the lattice 102. For example, the planned sequence 104 may be determined such that traversing the geographical region 150 via the planned sequence 104 may be at least partially optimized.

As illustrated, the lattice 102 of the general plan 100 includes an outline, boundaries, and/or row direction and spacing of the geographical region 150, and the planned sequence 104 defines various rows (e.g., row 108) for traversing the geographical region 150. In some embodiments, the planned sequence 104 can include directional instructions (e.g., arranging rows east-west, north-south, etc.). In other embodiments, the planned sequence 104 can include an amount of rows 108 for traversing the geographical region 150.

Figure 2:
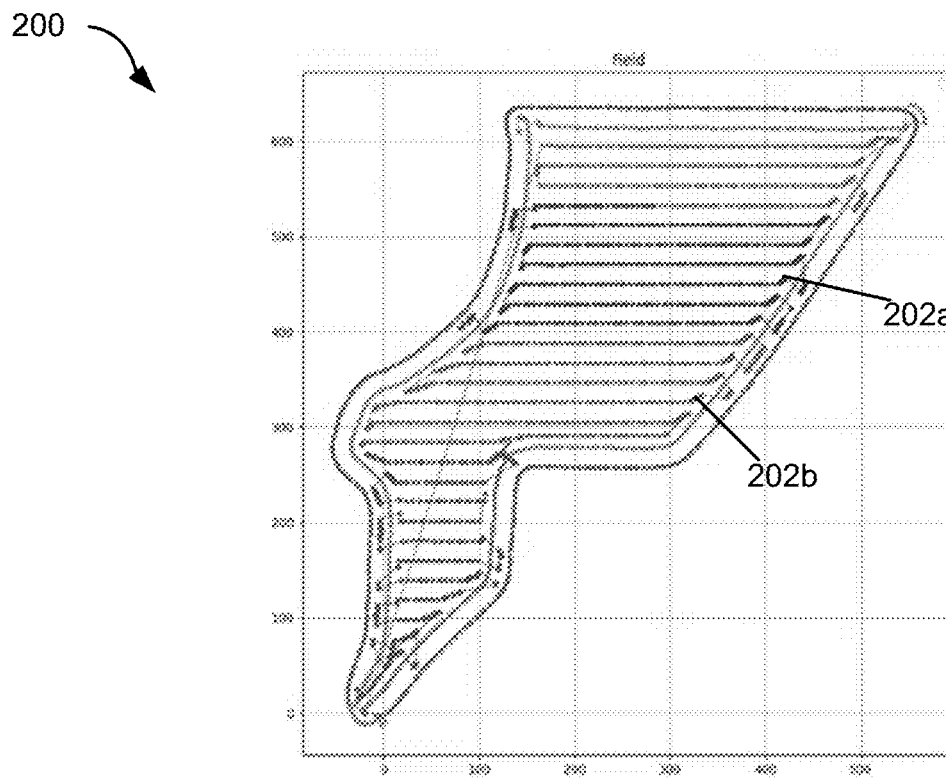
FIG. 2 depicts an embodiment of actual operator traversal data used to traverse the geographical region.
Figure 2:
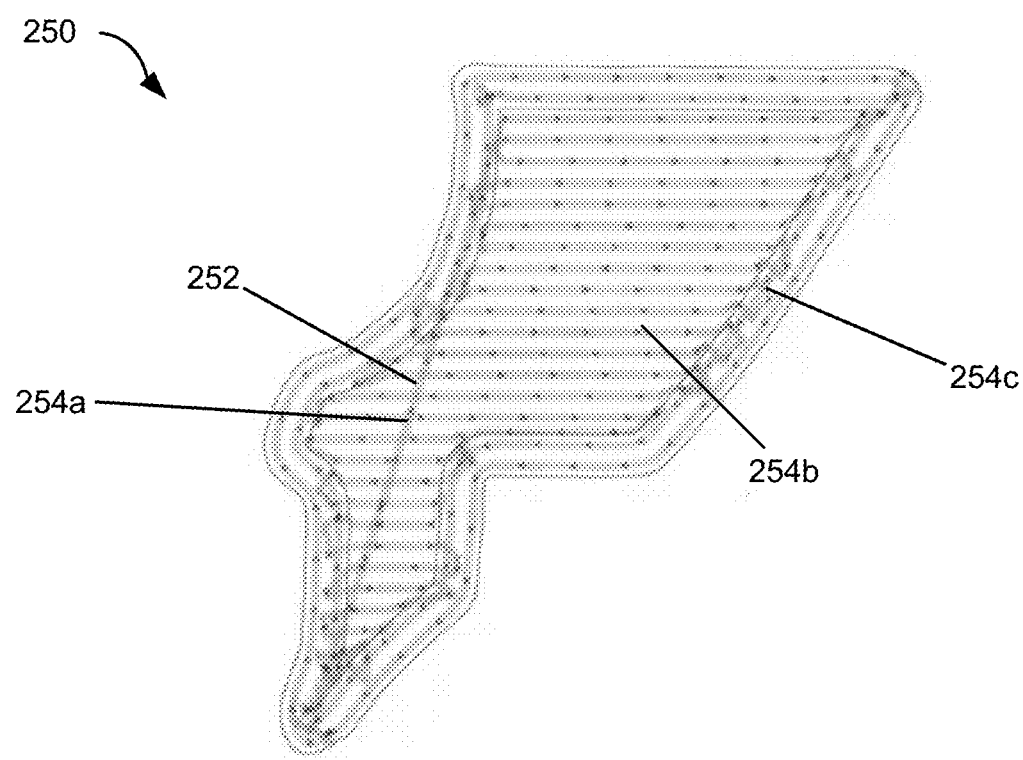

In FIG. 2, an embodiment of actual operator traversal data 200 used to traverse the geographical region 150 is illustrated. The actual operator traversal data 200 can represent a trajectory used by an entity to traverse the geographical region 150. For example, the actual operator traversal data 200 can include a trajectory or operator sequence used by an operator, an autonomous vehicle, and/or any other suitable entity to traverse the geographical region 150. In some embodiments, the actual operator traversal data 200 includes a set of data points corresponding to the entity. For example, the set of data points can include spatial data points, temporal data points, and/or any other suitable data points that represent the entity traversing the geographical region 150. In some embodiments, the spatial data points are corresponded to the temporal data points. For example, a first data point 202a included in the actual operator traversal data 200 may include first spatial data and first temporal data, and a second data point 202b included in the actual operator traversal data 200 may include second spatial data and second temporal data. The first spatial data and the first temporal data can indicate a first location of the entity with respect to the geographical region 150 at a first certain time, and the second spatial data and the second temporal data can indicate a second location of the entity with respect to the geographical region 150 at a second certain time.

In some embodiments, a computing device can be used to receive the general plan 100 and to receive and/or determine the actual operator traversal data 200. For example, the computing device can receive (e.g., via user input) the lattice 102 and the planned sequence 104 of the general plan 100, and the computing device can receive (e.g., via a separate computing device such as a computing device of an autonomous vehicle, etc.) the actual operator traversal data 200 of the entity traversing the geographical region 150. Additionally or alternatively, the computing device can extract the spatial data points and/or the temporal data points from a vehicle used to traverse the geographical region 150 or from other suitable sources. In some embodiments, the computing device can convert or otherwise process the spatial data points and temporal data points of the actual operator traversal data 200 into velocity data points included in a traversal map 250. The traversal map 250 can visually indicate how (e.g., with arrows indicating an order in which the points of the actual operator traversal data 200 are traversed, etc.) the entity traversed the geographical region 150.

As illustrated, the traversal map 250 includes an unbroken line 252 that represents the entity traversing the geographical region 150. In some embodiments, the computing device may generate the unbroken line 252 by connecting the spatial data points based on the temporal data points and including arrows or other visual indicators that indicate directions of respective data points of the unbroken line 252. For example, a first portion 254a of the unbroken line 252 can indicate that the entity traversed through the middle of the geographic region 150 for moving to a starting position, a second portion 254b of the unbroken line 252 can indicate that the entity traversed the particular row of the geographical region 150, and a third portion 254c of the unbroken line 252 can indicate that the entity traversed between rows of the geographical region 150 outside of the lattice 102. Other suitable indications can be provided by the traversal map 250.

Figure 3:
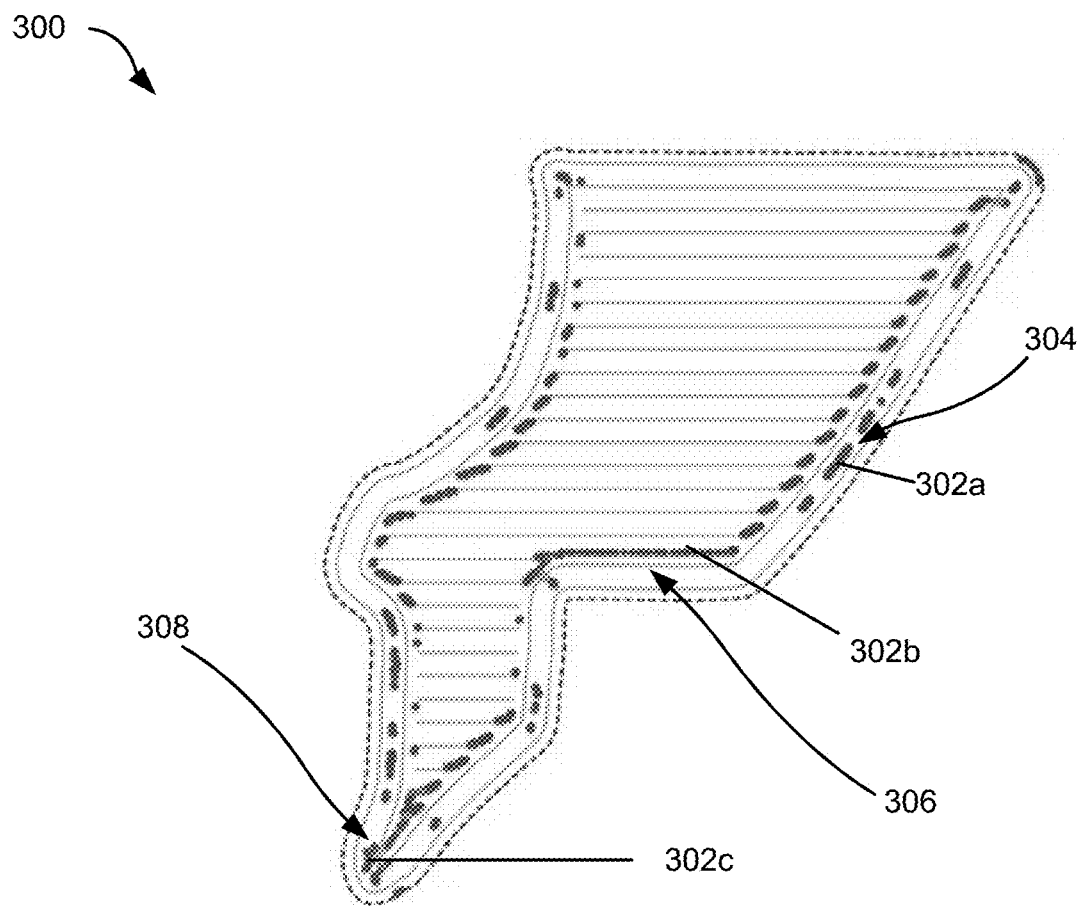
FIG. 3 depicts an embodiment of spatial deviations included in the actual operator traversal data and with respect to the general plan.
Figure 3:
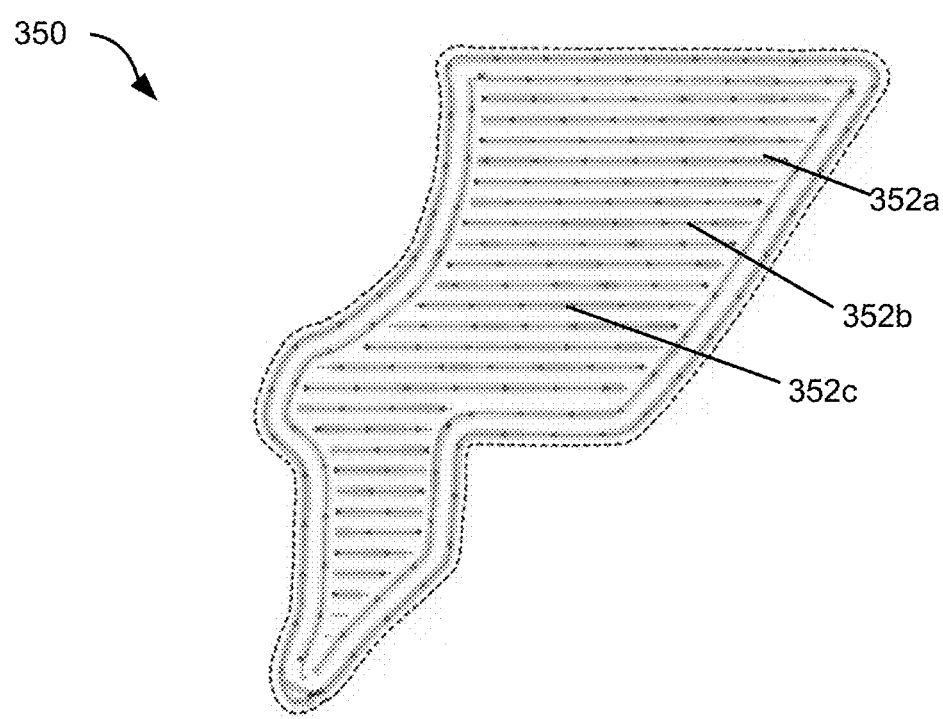

In FIG. 3, an embodiment of a plot 300 of spatial deviations included in the actual operator traversal data 200 and with respect to the general plan 100 is illustrated. The plot 300 can illustrate locations traversed by the entity with respect to the geographical region 150 that are not included in the general plan 100. In some embodiments, a tolerance range is determined for the general plan 100. For example, the tolerance range includes an allowable deviation from the general plan 100. Accordingly, the plot 300 can illustrate spatial deviations included in the actual operator traversal data 200, and with respect to the general plan 100, that are not within the tolerance range. For example, if the tolerance range is determined to be 15 meters (49.21 feet), then the plot 300 can illustrate spatial data points included in the actual operator traversal data 200 that are greater than 15 meters (49.21 feet) away from the lattice 102 of the general plan 100. The tolerance range can include any suitable measures, such as less than 15 meters (49.21 feet) or greater than 15 meters (49.21 feet), and, in some embodiments, the tolerance range can be adjusted or otherwise determined by a user of the computing device, the computing device, and/or any other suitable entity.

As illustrated in FIG. 3, the plot 300 includes various indications of spatial data points that are not within the general plan 100 plus the tolerance range or that otherwise do not conform to the general plan 100. For example, and among many additional nonconforming points, the plot 300 includes a first nonconforming point 302a, a second nonconforming point 302b, and a third nonconforming point 302c. Various inferences can be made, for example by a user of the computing device or by the computing device itself, relating to the first nonconforming point 302a, the second nonconforming point 302b, and/or the third nonconforming point 302c. For example, the first nonconforming point 302a can be included in a set of nonconforming points 304 positioned exterior with respect to rows included in the general plan 100. Accordingly, the entity may have traversed the set of nonconforming points 304 while turning around or otherwise switching from a presently traversing row to a subsequently traversing row of the general plan 100. Additionally, the second nonconforming point 302b can be included in a set of nonconforming points 306 positioned interior with respect to a row of the general plan 100. Accordingly, the entity may have traversed the set of nonconforming points 306 while inaccurately traversing a row (e.g., traversing an offset of the row) of the general plan 100. Additionally, the third nonconforming point 302c can be included in a set of nonconforming points 308 positioned with respect to multiple small rows at a bottom portion of the geographical region 150. Accordingly, the entity may have traversed the set of nonconforming points 308 while attempting to traverse very small rows (e.g., or difficult-to-traverse rows) of the general plan 100.

In some embodiments, the computing device can generate, or can be used to generate, a velocity deviation plot 350. The velocity deviation plot 350 can indicate locations with respect to the geographical region 150 that the entity traversed the general plan 100 at a speed lower than a speed threshold range. For example, the speed threshold range can be determined to be 20-25 km/hr (12.43-15.53 mph), and the computing device can determine point locations or segments of the actual operator traversal data 200 that the entity was below the speed threshold range, within the speed threshold range, and above the speed threshold range. The computing device can assign a different visual indicator to each of the determinations with respect to the speed threshold range. For example, the computing device can assign a first visual indicator 352a (e.g., the color red) to locations or segments of the actual operator traversal data 200 that the entity was traversing below the speed threshold range. Additionally, the computing device can assign a second visual indicator 352b (e.g., the color yellow) to locations or segments of the actual operator traversal data 200 that the entity was traversing within the speed threshold range. And, the computing device can assign a third visual indicator 352c (e.g., the color green) to locations or segments of the actual operator traversal data 200 that the entity was traversing above the speed threshold range. In some embodiments, the visual indicators can, instead of being discrete indicators, include a continuous visual indicator for indicating whether each location or segment included in the actual operator traversal data 200 is within the speed range threshold. In some embodiments, the locations or segments of the actual operator traversal data 200 traversed by the entity below the speed threshold range may be determined to be or otherwise labeled as not conforming to the general plan 100.

As illustrated in FIG. 3, the velocity deviation plot 350 is similar to the traversal map 250 illustrated and described with respect to FIG. 2. For example, the velocity deviation plot 350 can include arrows or other visual indicators of one or more directions of the entity traversing the geographical region 150. To generate the velocity deviation plot 350, the computing device can remove the spatial deviation points (e.g., illustrated with respect to the plot 300) from the traversal map 250. Additionally, the computing device can assign the first visual indicator, the second visual indicator, the third visual indicator, and/or any other suitable visual indicators to one or more locations or segments of the traversal map 250 for indicating whether a speed of the respective location or segment of the actual operator traversal data 200 is within the speed range threshold. Accordingly, the velocity deviation plot 350 includes (i) spatial data from the actual operator traversal data 200 that are within the tolerance range or that otherwise conform to the general plan 100 and (ii) velocity data having visual indicators of whether the speed of the entity traversing the spatial data is within the speed range threshold.

Figure 4:
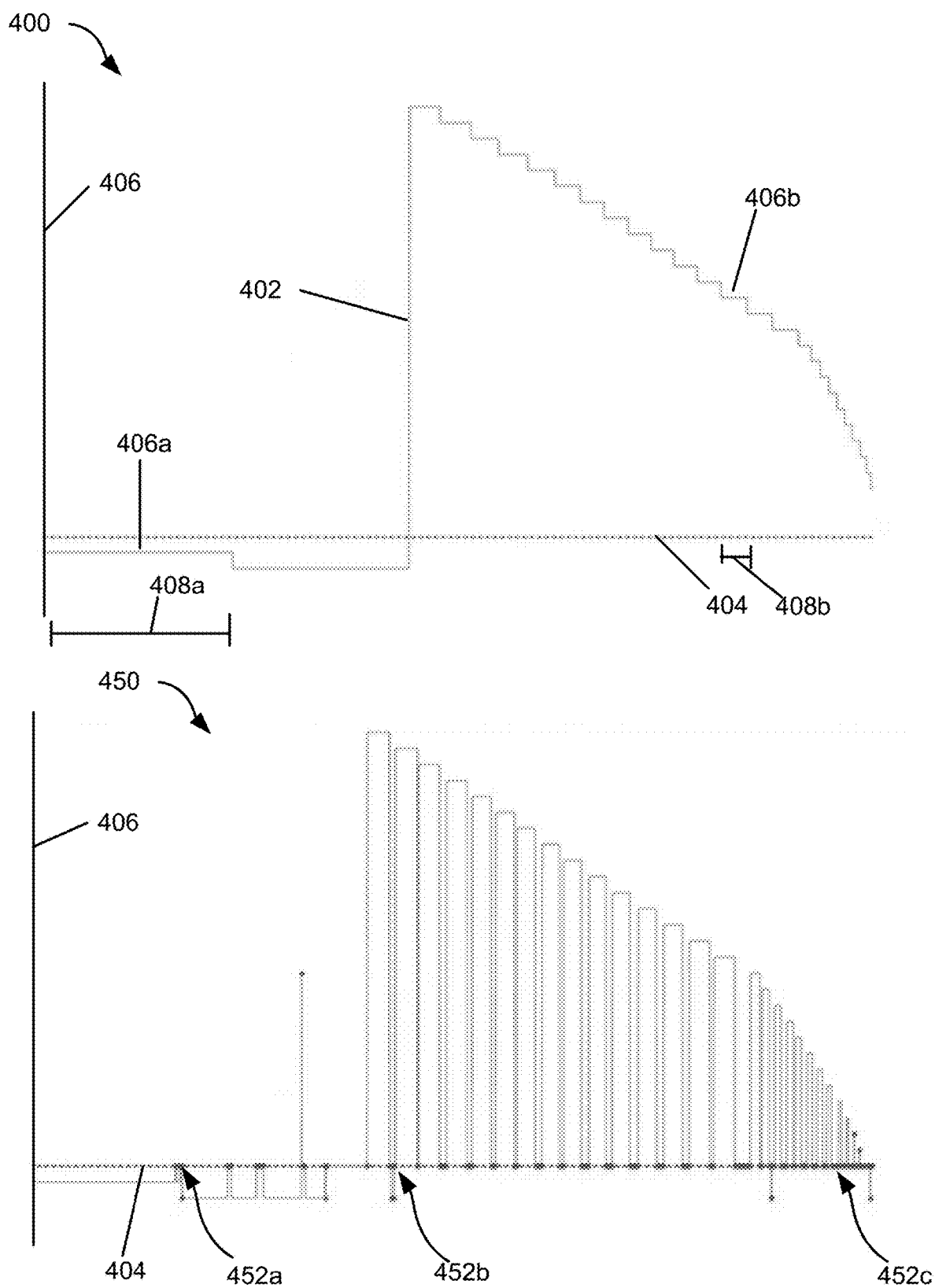
FIG. 4 depicts an embodiment of temporal deviations included in the actual operator traversal data and with respect to the general plan.

In FIG. 4, an embodiment of temporal deviations included in the actual operator traversal data and with respect to the general plan is illustrated. As illustrated, FIG. 4 includes (i) a temporal plot 400 associated with the actual operator traversal data 200 and (ii) a temporal deviation plot 450 that indicates temporal deviations included in the actual operator traversal data 200 with respect to the general plan 100. The temporal plot 400 can include an unbroken line 402 that can track a position with respect to time of the entity while traversing the geographical region 150. For example, the temporal plot 400 can include a horizontal axis 404 that represents time and a vertical axis 406 that represents a location with respect to the geographical region 150. Vertical and horizontal positions of the unbroken line 402 can indicate spatial (e.g., locations of the entity with respect to the geographical region 150) and temporal (e.g., time of the entity at corresponding locations) information about the entity as the entity traversed the geographical region 150. The temporal plot 400 can include any other suitable components or information for displaying temporal data with respect to the actual operator traversal data 200.

In some embodiments, the temporal plot 400 can track the position of the entity with respect to the actual operator traversal data 200 and to time. For example, each position on the vertical axis 406 can indicate that the entity is at a different indexed location of the lattice 102. In some embodiments, the lattice 102 is indexed by row and/or other suitable traversal units of the lattice 102. For example, a first portion 406a of the unbroken line 402 of the temporal plot 400 can indicate that the entity is traversing a first index (e.g., a first row of the geographical region 150) of the lattice 102 during a first period of time 408a. Additionally, a second portion 406b of the unbroken line 402 of the temporal plot 400 can indicate that the entity is traversing a second index (e.g., a second row of the geographical region 150) of the lattice 102 during a second period of time 408b, etc.

The computing device, or other suitable computing entity, can generate the temporal deviation plot 450 based on the temporal plot 400 and/or other suitable spatial data and/or temporal data with respect to the actual operator traversal data 200. For example, the computing device can determine one or more times or one or more periods of time of the actual operator traversal data 200 that the entity was not conforming to the general plan 100. In some embodiments, times or periods of times that do not conform to the general plan 100 may include times or periods of time in which the entity is not traversing the lattice 102 and/or any other suitable times or periods of time. The nonconforming times or periods of time may be identified by the computing device, and the computing device can assign a visual indicator and/or other suitable indicator for indicating that the nonconforming times or periods of time do not conform to the general plan 100 or that otherwise deviate from a temporal tolerance range when applied to the actual operator traversal data 200. The temporal tolerance range may be determined by the computing device, a suitable user of the computing device, and/or other suitable entities and may involve defining an allowable amount of time or other suitable temporal measure that the entity is not traversing the lattice 102 (e.g., lunch breaks, traversing locations not included in the lattice 102, etc.). In some embodiments, the visual indicator can include a first-colored point (e.g., red) that indicates that the entity, during the corresponding times or time periods, was not traversing the lattice 102 or was otherwise not conforming to the general plan 100. Other suitable visual indicators can be used to indicate that the entity, during the corresponding times or time periods, was not traversing the lattice 102 or was otherwise not conforming to the general plan 100.

In some embodiments, the temporal deviation plot 450 can include a first period of time 452a, a second period of time 452b, and a third period of time 452c. The first period of time 452a includes an amount of time that the entity did not traverse any portion of the lattice 102. In one example, an operator may have taken a lunch or other suitable break during the first period of time 452a. In other examples, the operator or an autonomous vehicle may have traversed outside of the geographical region 150. In yet other examples, the autonomous vehicle may have experienced a malfunction and may not have traversed anywhere during the first period of time 452a. The second period of time 452b includes an amount of time that the entity did not traverse a correct or expected portion of the lattice 102. In one example, the operator or the autonomous vehicle may have been switching from traversing a first index of the lattice 102 to traversing a second index of the lattice 102. For example, the operator or the autonomous vehicle may have finished traversing a first row of the geographical region 150 at a beginning of the second period of time 452b, and may have turned the vehicle around for traversing a second row of the geographical region 150 at an end of the second period of time 452b. Other suitable examples can be represented by the second period of time 452b. Additionally, the third period of time 452c includes an amount of time that the entity did not traverse a correct or expected portion of the lattice 102. In one example, the operator or the autonomous vehicle may have been traversing spatially small indexes of the lattice 102. For example, the operator or the autonomous vehicle may have been traversing short rows of the geographical region 150 such that the shortness of the rows made it difficult for the operator or the autonomous vehicle to conform to the general plan 100. Other suitable examples can be represented by the third period of time 452c.

Figure 5:
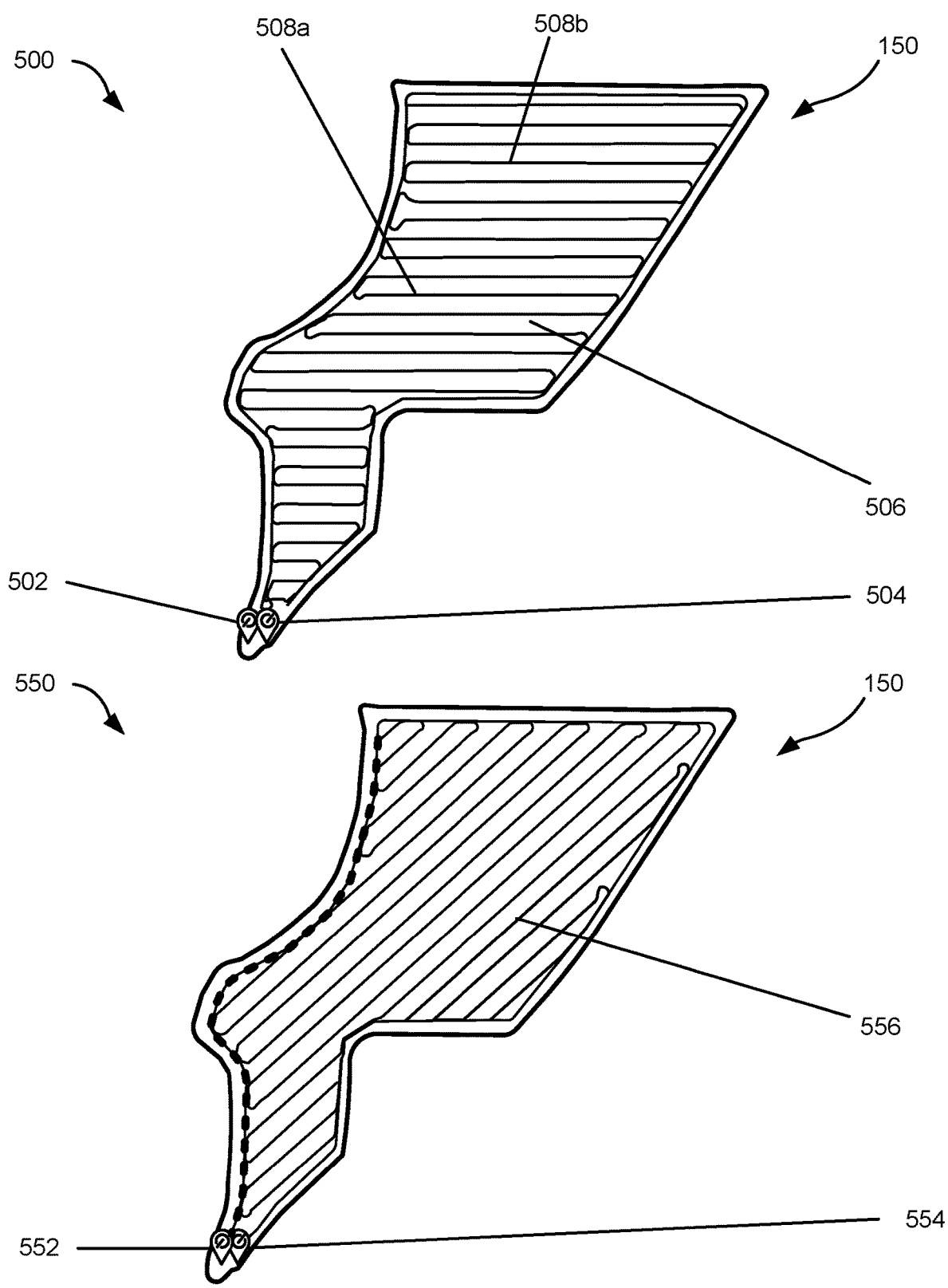
FIG. 5 depicts an embodiment of a specific plan generated based on the general plan and the actual operator traversal data.

In FIG. 5, an embodiment of a specific plan 500 generated based on the general plan 100 and the actual operator traversal data 200 is illustrated. The specific plan 500 can include a starting point 502, an ending point 504, an unbroken line 506, and/or any other suitable components for the specific plan 500. In some embodiments, the specific plan 500 defines (i) a starting location (e.g., the starting point 502) for the entity traversing the geographical region, (ii) a direction and/or order (e.g., the unbroken line 506) for the entity traversing the geographical region 150, and (iii) an ending location (e.g., the ending point 504) for the entity traversing the geographical region 150. As illustrated, the unbroken line 506 is similar to the planned sequence 104 included in the general plan 100. For example, the unbroken line 506 includes rows (e.g., first row 508a, second row 508b, etc.) that are substantially arranged in a similar direction to the planned sequence 104 included in the general plan 100.

In some embodiments, the specific plan 500 is determined using the general plan 100, the actual operator traversal data 200, and/or other suitable information such as the spatial deviations, temporal deviations, and the like included in or otherwise extracted from the actual operator traversal data 200. The computing device can determine or otherwise receive the tolerance range for the spatial data, for the temporal data, or for a combination thereof. Additionally, the computing device can determine a first subset of data included in the actual operator traversal data 200 that conforms to the general plan 100 (e.g., that is within the tolerance range with respect to the general plan 100). Accordingly, the computing device can populate the specific plan 500 using the first subset of data and may exclude, from the specific plan 500, a second subset of data included in the actual operator traversal data 200 that does not conform to the general plan 100 (e.g., that exceeds the tolerance range with respect to the general plan 100). The computing device can connect spatial data points included in the first subset of data and can optimize the connected spatial data points to generate the starting point 502, the ending point 504, and the unbroken line 506 that extends from the starting point 502 to the ending point 504.

In some embodiments, the computing device generates an optimized specific plan 550 based on the specific plan 500. The specific plan 500 may generally conform to the general plan 100. For example, the rows of the geographical region 150 and represented by the specific plan 500 can include a similar or identical direction as the planned sequence 104 included in the general plan 100. But, the specific plan 500 may not be an optimized plan for traversing the geographical region 150. For example, the specific plan 500 may cause an autonomous vehicle or a vehicle operated by an operator to use excessive amounts of fuel.

Accordingly, the computing device can generate the optimized specific plan 550 based on the specific plan 500. The optimized specific plan 550 may include a starting point 552, an ending point 554, an unbroken line 556, and/or any other suitable components for the optimized specific plan 550. In some embodiments, the starting point 552 can be similar or identical to the starting point 502 of the specific plan 500, and the ending point 554 may be similar or identical to the ending point 504 of the specific plan 500. But, the unbroken line 556 may be different than the unbroken line 506 of the specific plan 500. The unbroken line 556 can represent a path prescribed by the optimized specific plan 550 to be traversed by the entity to more efficiently traverse the geographical region 150 compared to traversing the geographical region 150 using the unbroken line 506. In one such example, traversing the geographical region 150 using the optimized specific plan 550 may reduce fuel consumption by a similar vehicle by approximately 15%. Other examples of fuel consumption reduction by using the optimized specific plan 550 are possible. In some embodiments, the reduction in fuel consumption may be due to various factors associated with the optimized specific plan 550. For example, the direction of the unbroken line 556 may be different than the planned sequence 104 included in the general plan 100. As illustrated, the planned sequence 104 is substantially horizontal, while the direction of the unbroken line 556 is substantially diagonal from left-to-right. Accordingly, a total distance for traversing the geographical region 150 may be reduced by using the optimized specific plan 550 compared to using the specific plan 500.

Figure 6:
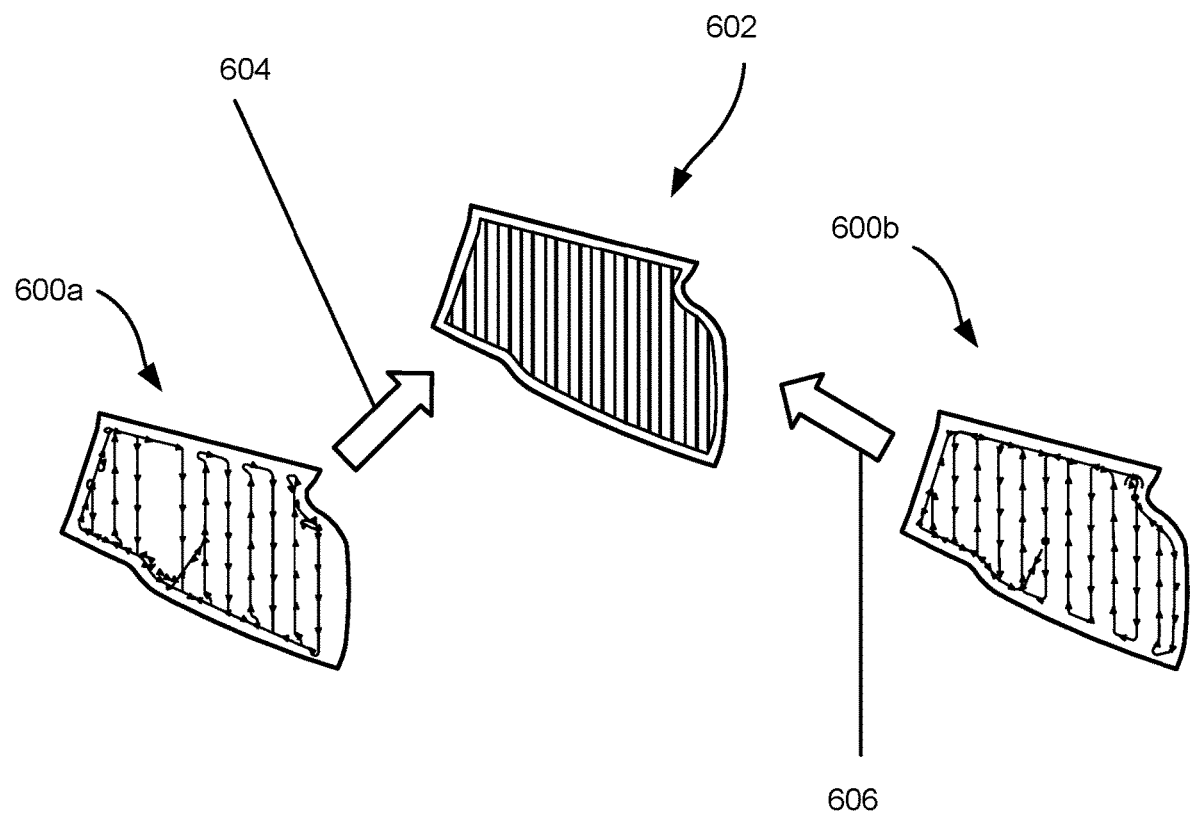
FIG. 6 depicts an embodiment of a comparison of actual operator traversal data and a specific plan.

In FIG. 6, an embodiment of a comparison of actual operator traversal data 600a-b and a specific plan 602 is illustrated. The specific plan 602 may be generated, for example by the computing device, based on a general plan and actual operator traversal data (e.g., separate from or including one of the actual operator traversal data 600a-b) associated with a geographical region different than the geographical region 150. The first actual operator traversal data 600a may include an operator sequence used by a first entity for traversing the geographical region, and the second actual operator traversal data 600b may include an operator sequence used by a second entity for traversing the geographical region. In some embodiments, the entities may be similar. For example, the first entity and the second entity may each be a distinct operator, a distinct autonomous vehicle, and the like. In other embodiments, the entities may be different. For example, the first entity may be an autonomous vehicle and the second entity may be an operator, or vice versa.

The first actual operator traversal data 600a and the second actual operator traversal data 600b can be compared to the specific plan 602. For example, a first comparison 604 can be made between the first actual operator traversal data 600a and the specific plan 602. Additionally, a second comparison 606 can be made between the second actual operator traversal data 600b and the specific plan 602. The first comparison 604 and the second comparison 606 can yield a measure of how close the first actual operator traversal data 600a and the second actual operator traversal data 600b, respectively, are to the specific plan 602. For example, the computing device can perform the first comparison 604 to determine how close the first actual operator traversal data 600a is to the specific plan 602, and the computing device can perform the second comparison 606 to determine how close the second actual operator traversal data 600b is to the specific plan 602. In some embodiments, the first comparison 604 and/or the second comparison 606 generates a numerical value that indicates how close the respective trajectory is to the specific plan 602. For example, a higher numerical value can indicate that a greater amount of data included in the respective trajectory corresponds to data included in the specific plan 602. Additionally or alternatively, a smaller numerical value can indicate that a smaller amount of data included in the respective trajectory corresponds to data included in the specific plan 602. In one such example, the first comparison 604 can output a first value of 84, and the second comparison 606 can output a second value of 97, though any other suitable values can be output by the first comparison 604 and/or the second comparison 606. Subsequently, the first value can be compared to the second value. Since the first value is less than the second value, the computing device can determine that the second entity (e.g., using the second actual operator traversal data 600b) more efficiently traversed than the first entity (e.g., using the first actual operator traversal data 600a).

Figure 7:
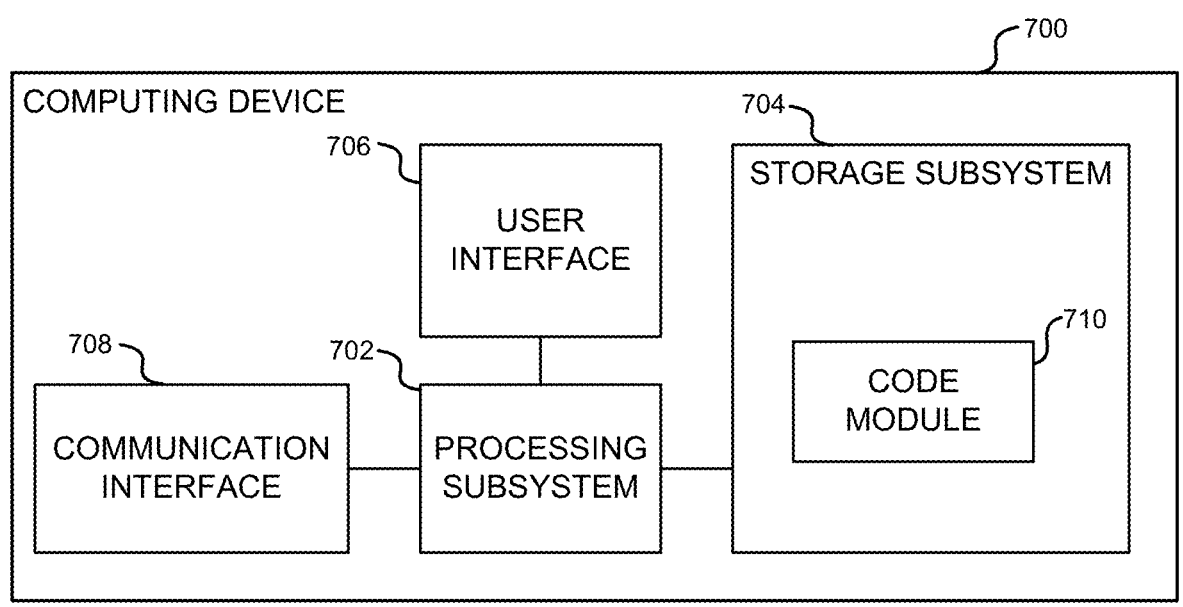
FIG. 7 depicts a block diagram of an embodiment of a computer system.

FIG. 7 is a simplified block diagram of a computing device 700. The computing device 700 can implement some or all functions, behaviors, and/or capabilities described herein that would use electronic storage or processing, as well as other functions, behaviors, or capabilities not expressly described. The computing device 700 includes a processing subsystem 702, a storage subsystem 704, a user interface 706, and/or a communication interface 708. The computing device 700 can also include other components (not explicitly shown) such as a battery, power controllers, and other components operable to provide various enhanced capabilities. In some embodiments, the computing device 700 can be implemented in a desktop computer, a laptop computer, a mobile device (e.g., tablet computer, smart phone, mobile phone), a wearable device, a media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform a function or combination of functions described above, and the like.

The storage subsystem 704 can be implemented using a local storage and/or removable storage medium, such as using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed-up RAM. In some embodiments, the storage subsystem 704 can store one or more applications and/or operating system programs to be executed by the processing subsystem 702, including programs to implement some or all operations described above that would be performed using a computer. For example, the storage subsystem 704 can store one or more code modules 710 for implementing one or more method steps described herein.

A firmware and/or software implementation may be implemented with modules such as procedures, functions, and so on. A machine-readable medium tangibly embodying instructions may be used in implementing methodologies described herein. The code modules 710, such as instructions stored in memory, may be implemented within a processor or external to the processor. As used herein, the term "memory" refers to a type of long term, short term, volatile, nonvolatile, or other suitable storage medium and is not to be limited to any particular type of memory or number of memories or type of media upon which memory is stored. Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment, such as the code modules 710, or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps, and means described herein may be done in various ways. For example, the techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 710 may include sets of instructions or codes embodied on a computer-readable medium that directs a processor of the computing device 700 to perform corresponding actions. The instructions may be configured to run in sequential order, in parallel, such as under different processing threads, or in a combination thereof. After loading a code module 710 on a general-purpose computer system, the general-purpose computer is transformed into a special-purpose computer system.

Computer programs incorporating various features described herein, such as in one or more of the code modules 710, may be encoded and stored on various computer readable storage media. Computer readable media encoded with the program code may be packaged with a compatible electronic device, or the program code may be provided separately from electronic devices such as via Internet download or as a separately packaged computer-readable storage medium, etc. The storage subsystem 704 can additionally store information useful for establishing network connections using the communication interface 708.

The user interface 706 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics such as digital-to-analog or analog-to-digital converters, signal processors, etc. A user can operate input devices of the user interface 706 to invoke the functionality of the computing device 700 and can view and/or hear output from the computing device 700 via output devices of the user interface 706. For some embodiments, the user interface 706 might not be present such as for a process using an ASIC.

The processing subsystem 702 can be implemented as one or more processors such as integrated circuits, one or more single-core or multi-core microprocessors, microcontrollers, central processing unit, graphics processing unit, etc. In operation, the processing subsystem 702 can control operation of the computing device 700. In some embodiments, the processing subsystem 702 can execute a variety of programs in response to program code and can maintain multiple concurrently executing programs or processes. At a given time, some or all of a program code to be executed can reside in the processing subsystem 702 and/or in storage media, such as the storage subsystem 704. Through programming, the processing subsystem 702 can provide various functionality for the computing device 700. The processing subsystem 702 can also execute other programs to control other functions of the computing device 700, including programs that may be stored in the storage subsystem 704.

The communication interface 708 can provide voice and/or data communication capability for the computing device 700. In some embodiments, the communication interface 708 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, the communication interface 708 can provide wired connectivity, such as universal serial bus, Ethernet, universal asynchronous receiver/transmitter, etc., in addition to, or in lieu of, a wireless interface. The communication interface 708 can be implemented using a combination of hardware (e.g., driver circuits, antennas, modulators/demodulators, encoders/decoders, and other analog and/or digital signal processing circuits) and software components. In some embodiments, the communication interface 708 can support multiple communication channels concurrently. In some embodiments, the communication interface 708 is not used.

It will be appreciated that the computing device 700 is illustrative and that variations and modifications are possible. The computing device 700 can have various functionality not specifically described, such as voice communication via cellular telephone networks, etc., and can include components appropriate to such functionality. Further, while the computing device 700 is described with reference to particular blocks, it is to be understood that these blocks are defined for convenience of description and are not intended to imply a particular physical arrangement of component parts. For example, the processing subsystem 702, the storage subsystem 704, the user interface 706, and/or the communication interface 708 can be in one device or distributed among multiple devices. Further, the blocks need not correspond to physically distinct components. Blocks can be configured to perform various operations, for example by programming a processor or providing appropriate control circuitry, and various blocks might or might not be reconfigurable depending on how an initial configuration is obtained. Embodiments of the present invention can be realized in a variety of apparatuses including electronic devices implemented using a combination of circuitry and software. Electronic devices described herein can be implemented using the computing device 700.

Figure 8:
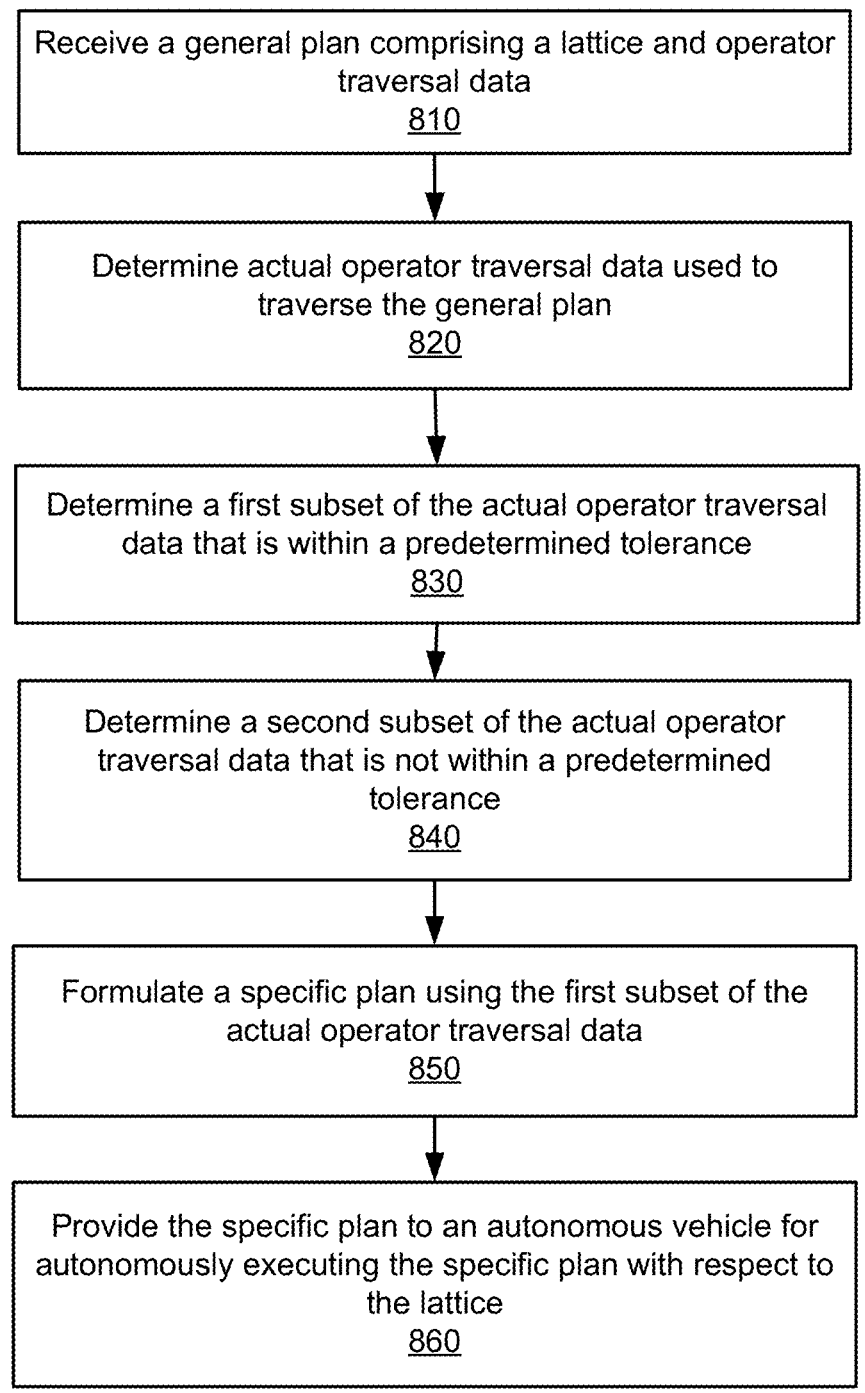
FIG. 8 depicts an embodiment of a process for generating and providing a specific traversal plan to an autonomous vehicle.

In FIG. 8, a flowchart of an embodiment of a process 800 for generating and providing a specific traversal plan (e.g., the specific plan 500) to an autonomous vehicle is illustrated. In some embodiments, the process 800 is performable by the computing device 700 and/or any other suitable computing device. The operations of the process 800 are described in a particular order, but the operations of the process 800 can be performed in any other suitable order including substantially contemporaneously.

One purpose of process 800 can include generating and providing instructions to the autonomous vehicle. For example, the operations described with respect to the process 800 may cause a specific traversal plan to be generated, and the specific traversal plan can be input into the autonomous vehicle. In some embodiments, the instructions included in the specific traversal plan, when executed, cause the autonomous vehicle to traverse a geographical region such as the geographical region 150.

Receiving a General Plan for a Planned Traversal

Process 800 begins at block 810 with receiving a general plan that includes a lattice and actual operator traversal data for traversing the lattice of the geographical region. The general plan, the lattice, and/or the actual operator traversal data received with respect to the block 810 can be similar or identical to the general plan 100, the lattice 102, and/or the planned sequence 104, respectively, associated with the geographical region 150. For example, the general plan can include the lattice that defines boundaries, indexes, row direction and spacing, and/or other suitable general features of the geographical region and a task associated with the planned sequence. Additionally, the general plan can include the actual operator traversal data that includes an operator sequence traversing the indexes, within the boundaries, and the like with respect to the lattice. In a particular example, the lattice can include external boundaries and interior rows included in the geographical region, and the actual operator traversal data can define the interior rows to be substantially arranged in a north-south configuration. Other suitable examples are possible for the general plan, the lattice, and/or the actual operator traversal data.

Determining Actual Operator Traversal Data Used to Traverse the General Plan

At block 820, actual operator traversal data used to traverse the general plan is determined. The actual operator traversal data can be similar or identical to the actual operator traversal data 200 illustrated and described with respect to FIG. 2. For example, the actual operator traversal data includes elements such as spatial data, temporal data, and/or any other suitable elements associated with an entity traversing the geographical region. The entity can include an operator, an autonomous vehicle, and/or any other suitable entity configured to traverse the geographical region using the general plan. In some embodiments, the computing device 700 receives data relating to the entity traversing the geographical region, and the computing device 700 extracts the actual operator traversal data used by the entity to traverse the geographical region.

In some embodiments, the elements included in the actual operator traversal data include (i) position (e.g., spatial) data of the entity with respect to the geographical region and (ii) time (e.g., temporal) data of the entity with respect to traversing the geographical region. The position data may indicate a position of the entity with respect to the lattice while the entity traverses the geographical region. Additionally, the time data may indicate a time and/or a speed at which the entity traversed respective positions of the position data while traversing the geographical region. In one such example, the actual operator traversal data can include a set of position data, a set of temporal data, and a set of speed data, and each data point included in the set of position data can be in one-to-one correspondence with at least one data point included in the set of temporal data and at least one data point included in the set of speed data. The elements included in the actual operator traversal data can include any other suitable data or sets of data relating to the entity traversing the geographical region.

Determining a Subset of the Actual Operator Traversal Data within a Tolerance Range At block 830, a first subset of the actual operator traversal data that is within a predefined tolerance is determined. The predefined tolerance can be determined by the computing device 700, or by any suitable user thereof and/or other suitable entity, and the predefined tolerance can define an allowable deviation of data in the actual operator traversal data from the general plan. In some embodiments, the computing device 700 determines, for at least a portion of spatial data of the elements included in the actual operator traversal data, whether the portion of the spatial data of the elements is included in the lattice of the general plan. The computing device 700 may determine that a first subset of the actual operator traversal data is included in the lattice of the general plan. The computing device 700 may additionally determine that a separate subset of the actual operator traversal data is not included in the lattice of the general plan, but that the separate subset is within the predefined tolerance with respect to the lattice of the general plan. Accordingly, the computing device 700 can augment the first subset of the actual operator traversal data with the separate subset of data to generate the first subset of the actual operator traversal data that is either within the lattice of the general plan or within the predefined tolerance thereof. In some embodiments, the computing device 700 can repeat the operations of the block 830 with respect to the temporal data of the elements included in the actual operator traversal data.

Determining a Subset of the Actual Operator Traversal Data not in the Tolerance Range At block 840, a second subset of the actual operator traversal data that is not within the predefined tolerance is determined. The computing device 700 can determine, for at least a portion of spatial data of the elements included in the actual operator traversal data, whether the portion of the spatial data of the elements is included in the lattice of the general plan. The computing device 700 may determine that a second subset of the actual operator traversal data is not included in the lattice of the general plan. Additionally, the computing device 700 can determine that the second subset of the actual operator traversal data is not within the predefined tolerance with respect to the lattice of the general plan. Accordingly, the computing device 700 can determine that the second subset of the actual operator traversal data is not within the lattice of the general plan or within the predefined tolerance thereof. In some embodiments, the computing device 700 can repeat the operations of the block 840 with respect to the temporal data of the elements included in the actual operator traversal data.

In some embodiments, a union of the first subset of data (e.g., determined with respect to the block 830) that is included in the lattice of the general plan or within the predefined tolerance thereof, and the second subset of data that is not included in the lattice of the general plan or within the predefined tolerance thereof can be equivalent to the actual operator traversal data. Additionally, an intersection of the first subset of data and second subset of data may be zero.

Formulating the Specific Traversal Plan

At block 850, a specific traversal plan is formulated based on the first subset of the actual operator traversal data. In some embodiments, the specific traversal plan includes data from the actual operator traversal data that conforms to the general plan. For example, the computing device 700 can determine the first subset of data of the actual operator traversal data such that the first subset of data either is included in the lattice of the general plan or is within the predefined tolerance thereof. In some embodiments, the computing device 700 determines the first subset of data of the actual operator traversal data based on the spatial data of the actual operator traversal data and/or the temporal data of the actual operator traversal data. The computing device 700 can use the first subset of data to generate the specific traversal plan. In one such example, the computing device 700 populates the specific traversal plan with the first subset of data and connects the spatial data of the first subset of data to generate a starting point, an ending point, and a traversal path (e.g., the unbroken line 506). Other suitable examples of the computing device 700 generating the specific traversal plan based on the first subset of data of the actual operator traversal data are possible.

In some embodiments, the actual operator traversal data can be compared to the specific traversal plan. For example, the computing device 700 can compare the actual operator traversal data to the specific traversal plan to determine an efficiency of the entity traversing the geographical region. The computing device 700 can compare the first subset of data of the actual operator traversal data to the second subset of the actual operator traversal data, and/or to other suitable components or portions of the actual operator traversal data or the specific traversal plan. In particular, the computing device 700 can determine a first percentage of space (e.g., of the geographical region, etc.) that the actual operator traversal data conformed to the specific traversal plan and a second percentage of time that the actual operator traversal data conformed to the specific traversal plan. The computing device 700 can use the first percentage and the second percentage to determine the efficiency of the entity traversing the geographical region.

Providing the Specific Traversal Plan to an Autonomous Vehicle

At block 860, the specific traversal plan is provided to an autonomous vehicle for autonomously executing the specific traversal plan with respect to the lattice. The specific traversal plan can include instructions, such as a starting point, and ending point, a traversal path, and/or the like, for controlling the autonomous vehicle. For example, the autonomous vehicle can receive the specific traversal plan and can execute the specific traversal plan, which may cause the autonomous vehicle to automatically traverse the geographical region based on the instructions included in the specific traversal plan.

In some embodiments, the computing device 700 optimizes the specific traversal plan to generate an optimized specific traversal plan (e.g., the optimized specific plan 550). For example, the computing device 700 can generate an optimized trajectory that minimizes a total distance for traversing the geographical region. The optimized trajectory may include a direction that is different than the planned sequence provided by the general plan. For example, the planned sequence may define a substantially north-south direction of indexes of the lattice, whereas the optimized trajectory may define a substantially diagonal direction of indexes of the lattice. Additionally, the computing device 700 can provide the optimized specific traversal plan as input into the autonomous vehicle for controlling traversal of the geographic region by the autonomous vehicle.

Figure 9:
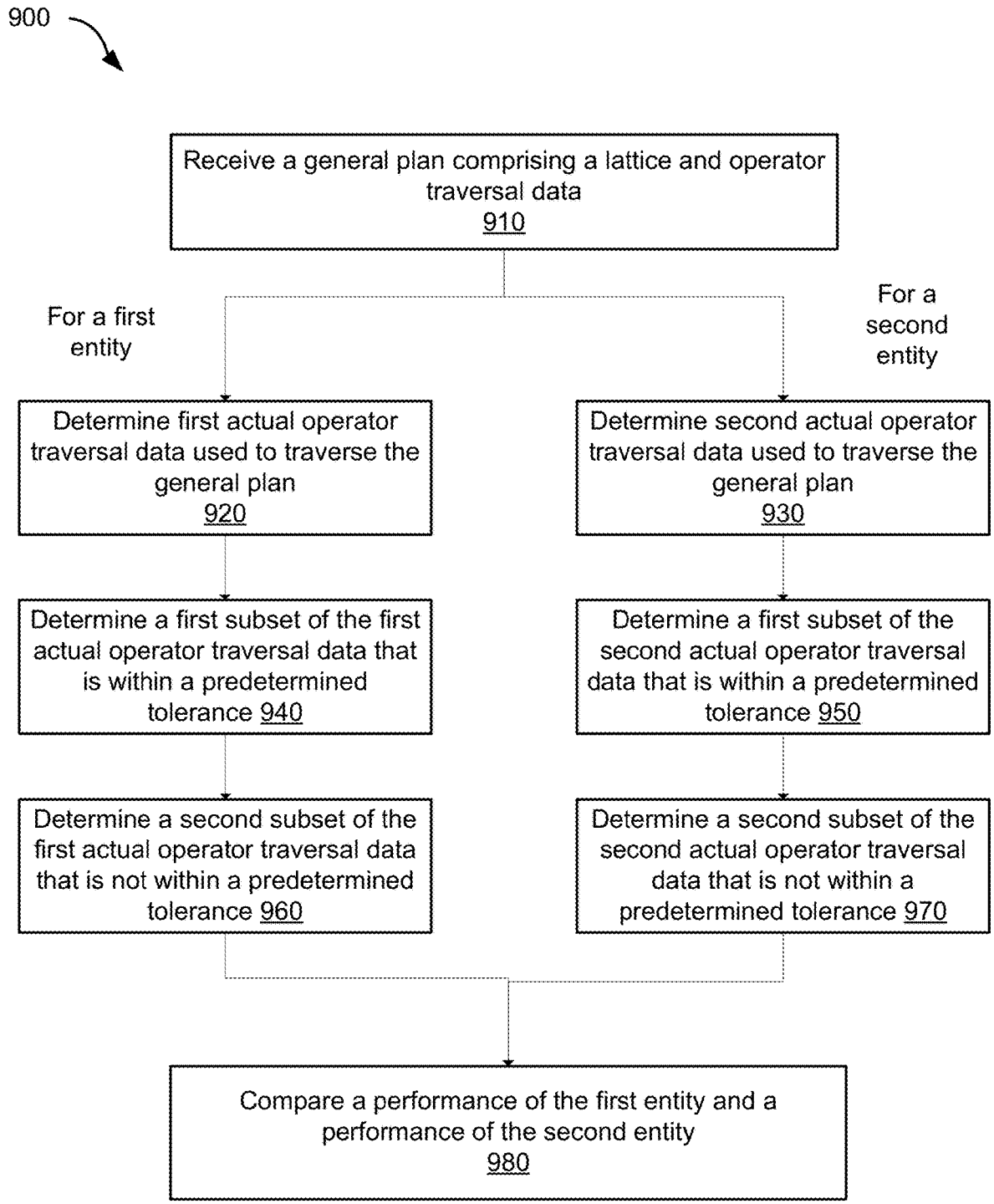
FIG. 9 depicts an embodiment of a process for comparing, using a specific plan, performances of entities with respect to traversing a lattice.

In FIG. 9, a flowchart of an embodiment of a process 900 for generating and providing a specific traversal plan to an autonomous vehicle is illustrated. In some embodiments, the process 900 is performable by the computing device 700 or any other suitable computing device. The operations of the process 900 are described in a particular order, but the operations of the process 900 can be performed in any other suitable order including substantially contemporaneously.

One purpose of process 900 can include comparing performances of respective entities with respect to traversing the geographical region. For example, the operations described with respect to the process 900 may cause actual operator traversal data to be generated for the respective entities, and the actual operator traversal data can be compared using a specific traversal plan such as the specific traversal plan determined with respect to the block 850 of the process 800. In some embodiments, the comparison performed via the process 900 can be used to judge performances of the respective entities with respect to traversing the geographical region.

Receiving a General Plan for a Planned Traversal

Process 900 begins at block 910 with receiving a general plan that includes a lattice and actual operator traversal data. The general plan, the lattice, and/or the actual operator traversal data received with respect to the block 810 can be similar or identical to the general plan 100, the lattice 102, and/or the planned sequence 104, respectively, associated with the geographical region 150. For example, the general plan can include the lattice that defines boundaries, indexes, row spacing and direction, and/or other suitable general features of the geographical region and a task associated with the planned sequence. Additionally, the general plan can include the actual operator traversal data that includes an operator sequence for traversing the indexes, within the boundaries, and the like with respect to the lattice. In a particular example, the lattice can include external boundaries and interior rows included in the geographical region, and actual operator traversal data can define the interior rows to be substantially arranged in a north-south configuration. Other suitable examples are possible for the general plan, the lattice, and/or the actual operator traversal data.

In some embodiments, the computing device 700 can formulate or otherwise determine the specific traversal plan using the general plan and using actual operator traversal data such as the actual operator traversal data, and data thereof, described with respect to the blocks 820-840 of the process 800. For example, the computing device 700 can determine a first subset of data of the actual operator traversal data that is included in the lattice of the general plan or within the predefined tolerance thereof. The computing device 700 can populate the specific traversal plan using the first subset of data and/or formulate the specific traversal plan using suitable techniques such as those described with respect to FIG. 5 and the block 850 of the process 800.

Determining First Actual Operator Traversal Data Associated with a First Entity

At block 920, first actual operator traversal data used to traverse the general plan is determined for a first entity. In some embodiments, the first entity includes an operator, an autonomous vehicle, any other suitable entity that traverses the general plan, or any suitable combination thereof. The first actual operator traversal data can include spatial and temporal data relating to the first entity traversing the geographical region. The spatial and temporal data can be divided, for example through analysis, to determine the operator sequence used to traverse the lattice. In some embodiments, the first actual operator traversal data can be similar or identical to the actual operator traversal data 200 illustrated and described with respect to FIG. 2. For example, the first actual operator traversal data includes elements such as spatial data, temporal data, and/or any other suitable elements associated with the first entity traversing the geographical region. In some embodiments, the computing device 700 receives data relating to the first entity traversing the geographical region, and the computing device 700 extracts the first actual operator traversal data used by the first entity to traverse the geographical region.

In some embodiments, the elements included in the first actual operator traversal data include (i) position (e.g., spatial) data of the first entity with respect to the geographical region and (ii) time (e.g., temporal) data of the first entity with respect to traversing the geographical region. The position data may indicate a position of the first entity with respect to the lattice while the first entity traverses the geographical region. Additionally, the time data may indicate a time and/or a speed at which the first entity traversed respective positions of the position data while traversing the geographical region. In one such example, the first actual operator traversal data can include a set of position data, a set of temporal data, and a set of speed data, and each data point included in the set of position data can be in one-to-one correspondence with at least one data point included in the set of temporal data and at least one data point included in the set of speed data. The elements included in the first actual operator traversal data can include any other suitable data or sets of data relating to the first entity traversing the geographical region.

Determining Second Actual Operator Traversal Data Associated with a Second Entity At block 930, second actual operator traversal data used to traverse the general plan is determined for a second entity. In some embodiments, the second entity includes an operator, an autonomous vehicle, any other suitable entity that traverses the general plan, or any suitable combination thereof. The second entity may be the same or similar type of entity as the first entity but need not be the same or similar. In some embodiments, the second actual operator traversal data can be similar or identical to the actual operator traversal data 200 illustrated and described with respect to FIG. 2. For example, the second actual operator traversal data includes elements such as spatial data, temporal data, and/or any other suitable elements associated with the second entity traversing the geographical region. The elements can be divided, for example through analysis, to determine the operator sequence of traversing the lattice. In some embodiments, the computing device 700 receives data relating to the second entity traversing the geographical region, and the computing device 700 extracts the second actual operator traversal data used by the second entity to traverse the geographical region.

In some embodiments, the elements included in the second actual operator traversal data include (i) position (e.g., spatial) data of the second entity with respect to the geographical region and (ii) time (e.g., temporal) data of the second entity with respect to traversing the geographical region. The position data may indicate a position of the second entity with respect to the lattice while the second entity traverses the geographical region. Additionally, the time data may indicate a time and/or a speed at which the second entity traversed respective positions of the position data while traversing the geographical region. In one such example, the second actual operator traversal data can include a set of position data, a set of temporal data, and a set of speed data, and each data point included in the set of position data can be in one-to-one correspondence with at least one data point included in the set of temporal data and at least one data point included in the set of speed data. The elements included in the second actual operator traversal data can include any other suitable data or sets of data relating to the second entity traversing the geographical region.

Determining a Subset of the First Actual Operator Traversal Data in the Tolerance Range At block 940, a first subset of the first actual operator traversal data that is within a predetermined tolerance is determined. The predefined tolerance can be determined by the computing device 700, or by any suitable user thereof and/or other suitable entity, and the predefined tolerance can define an allowable deviation of data in the first actual operator traversal data from the general plan. In some embodiments, the computing device 700 determines, for at least a portion of spatial data of the elements included in the first actual operator traversal data, whether the portion of the spatial data of the elements is included in the lattice of the general plan. The computing device 700 may determine that a first subset of the first actual operator traversal data is included in the lattice of the general plan. The computing device 700 may additionally determine that a separate subset of the first actual operator traversal data is not included in the lattice of the general plan, but that the separate subset is within the predefined tolerance with respect to the lattice of the general plan. Accordingly, the computing device 700 can augment the first subset of the first actual operator traversal data with the separate subset of data to generate the first subset of the first actual operator traversal data that is either within the lattice of the general plan or within the predefined tolerance thereof. In some embodiments, the computing device 700 can repeat the operations of the block 940 with respect to the temporal data of the elements included in the first actual operator traversal data.

Determining a Subset of the Second Actual Operator Traversal Data in the Tolerance Range At block 950, a first subset of the second actual operator traversal data that is within the predetermined tolerance is determined. The predefined tolerance can be determined by the computing device 700, or by any suitable user thereof and/or other suitable entity, and the predefined tolerance can define an allowable deviation of data in the second actual operator traversal data from the general plan. In some embodiments, the computing device 700 determines, for at least a portion of spatial data of the elements included in the second actual operator traversal data, whether the portion of the spatial data of the elements is included in the lattice of the general plan. The computing device 700 may determine that a first subset of the second actual operator traversal data is included in the lattice of the general plan. The computing device 700 may additionally determine that a separate subset of the second actual operator traversal data is not included in the lattice of the general plan, but that the separate subset is within the predefined tolerance with respect to the lattice of the general plan. Accordingly, the computing device 700 can augment the first subset of the second actual operator traversal data with the separate subset of data to generate the first subset of the second actual operator traversal data that is either within the lattice of the general plan or within the predefined tolerance thereof. In some embodiments, the computing device 700 can repeat the operations of the block 950 with respect to the temporal data of the elements included in the second actual operator traversal data.

Determining a Subset of the First Actual Operator Traversal Data not in the Tolerance Range At block 960, a second subset of the first actual operator traversal data that is not within the predetermined tolerance is determined. The computing device 700 can determine, for at least a portion of spatial data of the elements included in the first actual operator traversal data, whether the portion of the spatial data of the elements is included in the lattice of the general plan. The computing device 700 may determine that the second subset of the first actual operator traversal data is not included in the lattice of the general plan. Additionally, the computing device 700 can determine that the second subset of the first actual operator traversal data is not within the predefined tolerance with respect to the lattice of the general plan. Accordingly, the computing device 700 can determine that the second subset of the first actual operator traversal data is not within the lattice of the general plan or within the predefined tolerance thereof. In some embodiments, the computing device 700 can repeat the operations of the block 960 with respect to the temporal data of the elements included in the first actual operator traversal data.

In some embodiments, a union of the first subset of data (e.g., determined with respect to the block 940) that is included in the lattice of the general plan or within the predefined tolerance thereof, and the second subset of data that is not included in the lattice of the general plan or within the predefined tolerance thereof can be equivalent to the first actual operator traversal data. Additionally, an intersection of the first subset of data and second subset of data may be zero.

Determining a Subset of the Second Actual Operator Traversal Data not in the Tolerance Range At block 970, a second subset of the second actual operator traversal data that is not within the predetermined tolerance is determined. The computing device 700 can determine, for at least a portion of spatial data of the elements included in the second actual operator traversal data, whether the portion of the spatial data of the elements is included in the lattice of the general plan. The computing device 700 may determine that the second subset of the second actual operator traversal data is not included in the lattice of the general plan. Additionally, the computing device 700 can determine that the second subset of the second actual operator traversal data is not within the predefined tolerance with respect to the lattice of the general plan. Accordingly, the computing device 700 can determine that the second subset of the second actual operator traversal data is not within the lattice of the general plan or within the predefined tolerance thereof. In some embodiments, the computing device 700 can repeat the operations of the block 970 with respect to the temporal data of the elements included in the second actual operator traversal data.

In some embodiments, a union of the first subset of data (e.g., determined with respect to the block 950) that is included in the lattice of the general plan or within the predefined tolerance thereof, and the second subset of data that is not included in the lattice of the general plan or within the predefined tolerance thereof can be equivalent to the second actual operator traversal data. Additionally, an intersection of the first subset of data and second subset of data may be zero.

In some embodiments, the computing device 700 can formulate or otherwise determine the specific traversal plan using the general plan and using the first actual operator traversal data and/or the second actual operator traversal data. For example, the computing device 700 can determine the first subset of data of the first actual operator traversal data that is included in the lattice of the general plan or within the predefined tolerance thereof. Additionally, the computing device 700 can determine the first subset of data of the second actual operator traversal data that is included in the lattice of the general plan or within the predefined tolerance thereof. The computing device 700 can populate the specific traversal plan using the first subset of data of the first actual operator traversal data, the first subset of data of the second actual operator traversal data, or a combination thereof. Additionally or alternatively, the computing device 700 can formulate the specific traversal plan using suitable techniques such as those described with respect to FIG. 5 and the block 850 of the process 800.

Comparing Performances of the First Entity and the Second Entity

At block 980, a performance of the first entity with respect to traversing the specific traversal plan is compared to a performance of the second entity with respect to traversing the specific traversal plan. The computing device 700 can determine a first amount of space and time that the first actual operator traversal data conformed to (e.g., was included in the lattice or otherwise within the tolerance range thereof) the specific traversal plan. Additionally, the computing device 700 can determine a second amount of space and time that the second actual operator traversal data conformed to (e.g., was included in the lattice or otherwise within the tolerance range thereof) the specific traversal plan. Accordingly, the computing device 700 can compare the first amount of space and time to the second amount of space and time for comparing the performance of the first entity traversing the geographical region to the performance of the second entity traversing the geographical region.

In some embodiments, comparing the performance of the first entity to the performance of the second entity involves comparing the performance of the first entity to the specific traversal plan and comparing the performance of the second entity to the specific traversal plan. For example, the computing device 700 can perform a first comparison between the first actual operator traversal data and the specific traversal plan. The first comparison involves determining whether and/or how much in terms of space and time the first actual operator traversal data conforms to the specific plan. A result of the first comparison can include a numerical value such as a numerical value from 0-100 (or any other suitable numerical scale or range) such that a lower numerical value indicates less conformity of the first actual operator traversal data to the specific traversal plan and that a greater numerical value indicates greater conformity of the first actual operator traversal data to the specific traversal plan. Additionally, the computing device 700 can perform a second comparison between the second actual operator traversal data and the specific traversal plan. The second comparison involves determining whether and/or how much in terms of space and time the second actual operator traversal data conforms to the specific plan. A result of the second comparison can include a numerical value such as a numerical value from 0-100 (or any other suitable numerical scale or range) such that a lower numerical value indicates less conformity of the second actual operator traversal data to the specific traversal plan and that a greater numerical value indicates greater conformity of the second actual operator traversal data to the specific traversal plan.

The computing device 700 can compare a result of the first comparison to a result of the second comparison to compare the performance of the first entity to the performance of the second entity. For example, if the result of the first comparison is 83 and the result of the second comparison is 56, then the computing device 700 can determine that the performance of the first entity is better than the performance of the second entity with respect to traversing the geographical region. Other suitable examples of comparing the result of the first comparison to the result of the second comparison for determining whether the performance of the first entity or the performance of the second entity is better with respect to traversing the geographical region are possible.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A method for generating and providing an optimized specific plan for traversal of a geographical region by an autonomous vehicle, the method comprising:
   receiving, by a computing device, a general plan for traversing the geographical region, the general plan comprising:
      a lattice representing the geographical region; and
      a planned sequence of operator traversal data for traversing the lattice of the geographical region;
   determining, by the computing device, actual operator traversal data generated by a first entity in traversing the geographical region, the actual operator traversal data comprising an operator sequence that includes a plurality of elements corresponding to spatial and temporal data of the actual operator traversal data;
   determining, by the computing device, a tolerance range that defines an allowable deviation of the actual operator traversal data from the general plan;
   determining, by the computing device, a first subset of the plurality of elements that is within the determined tolerance range;
   determining, by the computing device, a second subset of the plurality of elements that is not within the determined tolerance range;
   generating, by the computing device, a specific plan for traversing the geographical region based on the general plan, the specific plan comprising the first subset of the plurality of elements included in the actual operator traversal data and defining a starting location and an ending location for traversing the geographical region by the autonomous vehicle;
   comparing, by the computing device, the actual operator traversal data to separate actual operator traversal data generated by a separate entity in traversing the geographical region by:
      determining, by the computing device, a first amount of space and time that the actual operator traversal data conformed to the specific plan;
      determining, by the computing device, a second amount of space and time that the separate actual operator traversal data conformed to the specific plan; and
      comparing, by the computing device, the first amount of space and time to the second amount of space and time;
   optimizing the specific plan based on the comparison of the first amount of space and time to the second amount of space and time;
   providing, by the computing device, the optimized specific plan as input into the autonomous vehicle; and
   traversing the geographic region by the autonomous vehicle according to the optimized specific plan.

2. The method of claim 1, wherein the plurality of elements that corresponds to spatial and temporal data comprises:
   position data that indicates a position of the first entity with respect to the lattice during traversal of the geographic region by the first entity; and
   temporal data that indicates a time and speed at which the first entity traversed respective positions of the position data while traversing the geographic region.

3. The method of claim 1, further comprising:
   further optimizing, by the computing device, the specific plan by generating an optimized trajectory that minimizes a total distance required to traverse the geographic region; and
   providing, by the computing device, the further optimized specific plan as input into an autonomous vehicle for controlling traversal of the geographic region by the autonomous vehicle.

4. The method of claim 1, wherein a union of the first subset of the plurality of elements and the second subset of the plurality of elements is the plurality of elements, wherein an intersection of the first subset of the plurality of elements and the second subset of the plurality of elements is zero.

5. The method of claim 1, wherein determining the first subset of the plurality of elements that is within the determined tolerance range comprises, for each element included in the plurality of elements:
   determining whether a spatial component of the element is included in the lattice of the general plan; and
   if the spatial component of the element is not included in the lattice, determining whether the spatial component is within the determined tolerance range of the lattice.

6. A method for generating and providing a specific plan for traversal of a geographical region by an autonomous vehicle, the method comprising:
   receiving, by a computing device, a general plan for traversing the geographical region, the general plan comprising:
      a lattice representing the geographical region; and
      a planned sequence of operator traversal data for traversing the lattice of the geographical region;
   determining, by the computing device, actual operator traversal data generated by an entity in traversing the geographical region, the actual operator traversal data comprising an operator sequence that includes a plurality of elements corresponding to spatial and temporal data of the actual operator traversal data;
   determining, by the computing device, a tolerance range that defines an allowable deviation of the actual operator traversal data from the general plan;

determining, by the computing device, a first subset of the plurality of elements that is within the determined tolerance range;

determining, by the computing device, a second subset of the plurality of elements that is not within the determined tolerance range;

generating, by the computing device, a specific plan for traversing the geographical region based on the general plan, the specific plan comprising the first subset of the plurality of elements included in the actual operator traversal data and defining a starting location and an ending location for traversing the geographical region by the autonomous vehicle;

providing, by the computing device, the specific plan as input into the autonomous vehicle; and traversing the geographic region by the autonomous vehicle according to the specific plan.

7. The method of claim 6, further comprising:

comparing, by the computing device, the actual operator traversal data to the specific plan for determining an efficiency of the actual operator traversal data.

8. The method of claim 7, further comprising:

comparing, by the computing device, the actual operator traversal data to separate actual operator traversal data used by a separate entity to traverse the geographical region.

9. The method of claim 8, wherein comparing the actual operator traversal data to the separate actual operator traversal data comprises:

determining, by the computing device, a first amount of space and time that the actual operator traversal data conformed to the specific plan;

determining, by the computing device, a second amount of space and time that the separate actual operator traversal data conformed to the specific plan; and comparing, by the computing device, the first amount of space and time to the second amount of space and time.

10. The method of claim 6, wherein the plurality of elements that corresponds to spatial and temporal data comprises:

position data that indicates a position of the entity with respect to the lattice during traversal of the geographic region by the entity; and temporal data that indicates a time and speed at which the entity traversed respective positions of the position data while traversing the geographic region.

11. The method of claim 6, further comprising:

optimizing, by the computing device, the specific plan by generating an optimized trajectory that minimizes a total distance required to traverse the geographic region; and providing, by the computing device, the optimized specific plan as input into the autonomous vehicle for controlling traversal of the geographic region by the autonomous vehicle.

12. The method of claim 6, wherein a union of the first subset of the plurality of elements and the second subset of the plurality of elements is the plurality of elements, wherein an intersection of the first subset of the plurality of elements and the second subset of the plurality of elements is zero.

13. The method of claim 6, wherein determining the first subset of the plurality of elements that is within the determined tolerance range comprises, for each element included in the plurality of elements:

determining whether a spatial component of the element is included in the lattice of the general plan; and if the spatial component of the element is not included in the lattice, determining whether the spatial component is within the determined tolerance range of the lattice.

14. A method for generating and providing an optimized specific plan for traversal of a geographical region by an autonomous vehicle, the method comprising:

receiving, by a computing device, a general plan for traversing the geographical region, the general plan comprising:
- a lattice representing the geographical region; and
- a planned sequence of operator traversal data for traversing the lattice of the geographical region;

determining, by the computing device, actual operator traversal data generated by an entity in traversing the geographical region, the actual operator traversal data comprising an operator sequence that includes a plurality of elements corresponding to spatial and temporal data of the actual operator traversal data;

determining, by the computing device, a tolerance range that defines an allowable deviation of the actual operator traversal data from the general plan;

determining, by the computing device, a first subset of the plurality of elements that is within the determined tolerance range;

determining, by the computing device, a second subset of the plurality of elements that is not within the determined tolerance range;

generating, by the computing device, a specific plan for traversing the geographical region based on the general plan, the specific plan comprising the first subset of the plurality of elements included in the actual operator traversal data and defining a starting location and an ending location for traversing the geographical region by the autonomous vehicle;

determining, by the computing device, an efficiency of the entity in traversing the geographical region by comparing the actual operator traversal data to the specific plan;

optimizing the specific plan based on the efficiency of the entity in traversing the geographical region;

providing, by the computing device, the optimized specific plan as input into the autonomous vehicle; and traversing the geographic region by the autonomous vehicle according to the optimized specific plan.

15. The method of claim 14, further comprising:

comparing, by the computing device, the actual operator traversal data to separate actual operator traversal data used by a separate entity to traverse the geographical region.

16. The method of claim 15, wherein comparing the actual operator traversal data to the separate actual operator traversal data comprises:

determining, by the computing device, a first amount of space and time that the actual operator traversal data conformed to the specific plan;

determining, by the computing device, a second amount of space and time that the separate actual operator traversal data conformed to the specific plan; and comparing, by the computing device, the first amount of space and time to the second amount of space and time.

17. The method of claim 14, further comprising:

providing, by the computing device, the specific plan as input into an autonomous vehicle for controlling traversal of the geographic region by the autonomous vehicle.

18. The method of claim 17, further comprising:
further optimizing, by the computing device, the specific plan by generating an optimized trajectory that minimizes a total distance required to traverse the geographic region; and
providing, by the computing device, the further optimized specific plan as input into the autonomous vehicle for controlling traversal of the geographic region by the autonomous vehicle.

19. The method of claim 14, wherein the plurality of elements that corresponds to spatial and temporal data comprises:
position data that indicates a position of the entity with respect to the lattice during traversal of the geographic region by the entity; and
temporal data that indicates a time and speed at which the entity traversed respective positions of the position data while traversing the geographic region.

20. The method of claim 14, wherein a union of the first subset of the plurality of elements and the second subset of the plurality of elements is the plurality of elements, wherein an intersection of the first subset of the plurality of elements and the second subset of the plurality of elements is zero.

\* \* \* \* \*